United States Patent [19]
Virnich

[11] Patent Number: 5,541,575
[45] Date of Patent: Jul. 30, 1996

[54] LEAKAGE DETECTION SYSTEM

[76] Inventor: Ulrich Virnich, Eichendorfstr. 6, 92318 Neumarkt, Germany

[21] Appl. No.: 278,442

[22] Filed: Jul. 21, 1994

[30] Foreign Application Priority Data

Jul. 23, 1993 [DE] Germany ............ 43 24 865.9

[51] Int. Cl.⁶ ............ G08B 29/00; G08B 21/00
[52] U.S. Cl. ............ 340/506; 340/605; 340/612; 340/618; 73/290 R; 73/304 R; 137/386
[58] Field of Search ............ 340/506, 605, 340/612, 618, 870.16, 870.17, 596; 73/290 R, 304 R; 137/386

[56] References Cited

U.S. PATENT DOCUMENTS

| | | | |
|---|---|---|---|
| 4,646,069 | 2/1987 | Andrejasich et al. | 340/620 |
| 4,855,714 | 8/1989 | Clarkson et al. | 340/521 |
| 5,202,667 | 4/1993 | Alvin | 340/605 |
| 5,264,833 | 11/1993 | Jeffers et al. | 340/605 |
| 5,325,312 | 6/1994 | Kidd | 340/605 |

FOREIGN PATENT DOCUMENTS

| | | |
|---|---|---|
| 0043431 | 1/1982 | European Pat. Off. . |
| 0073322 | 3/1983 | European Pat. Off. . |
| 0319200 | 6/1989 | European Pat. Off. . |
| 0337630 | 10/1989 | European Pat. Off. . |
| 2577656 | 8/1986 | France . |
| 3636074 | 4/1988 | Germany . |
| 2213270 | 8/1989 | United Kingdom . |

OTHER PUBLICATIONS

"Multiplexed detectors isolate water leaks" Electronics; Dec. 11, 1975 p. 116.
High Sensitive System for Leak Detection on Safety–relevant Pipes R. Hampel, H. Rademacher and F. Worlitz, Technisches Messen 58 Jan. 1991).
Interkama 89: Sensor Systems for Industrial Measurement Engineering H.–J. Schneider, Leverkusen, Automatisierungstechnische Praxis Jan. 1990.

*Primary Examiner*—Donnie L. Crosland
*Attorney, Agent, or Firm*—Victor M. Genco, Jr.

[57] ABSTRACT

A leakage detection system is provided having a plurality of locally distributed integrated units with a leakage sensor, preprocessing unit, and evaluation unit which connects with the individual integrated units or with a group of integrated units via a serial bus line. In each preprocessing unit, the value measured by the leakage sensor is subjected to a temperature compensation process.

5 Claims, 6 Drawing Sheets

LEAKAGE DETECTION SYSTEM

FIELD OF THE INVENTION

The invention relates to a leakage detection system wherein leakage sensors are connected to a local preprocessing unit for further processing.

BACKGROUND OF THE INVENTION

Leakage detection systems are used to detect undesirable spills of contaminating substances such as oil and gasoline from storage containers and tanks so that countermeasures can be taken.

EPO 0 337 630 A1 relates to a leakage sensor for the detection of oil that comprises a strip-shaped sensor material embedded into a flat housing which in turn is embedded in an oil-absorbing material. The strip-shaped sensor material is connected to an electrical supply line at both ends. The sensor material may consist of a mixture of an electrically conductive substance, such as carbon, with porous polytetrafluorethylene (PTFE). If wetted with oil, the sensor strip will change its electrical resistance, and this effect is utilized for leakage detection. The flat housing into which the strip-shaped sensor material is embedded consists of porous PTFE so that the leaking oil penetrates up to the strip-shaped sensor material. The oil-absorbing material into which the sensor housing is embedded may be a textile material, such as isotactic polypropylene. The material absorbs oil almost instantly, but hardly absorbs any water. This oil-absorbing material ensures that leaking oil reaches the strip-shaped sensor material over large surfaces and that the oil is held long enough to reach the sensor material. As a consequence, the sensitivity of the leakage sensor is increased.

The oil-absorbing material into which the sensor itself is embedded is accommodated in a protective tube which has openings to allow the passage of leaking oil and an outlet for the electrical lines connected with the sensor strips.

In the conventional leakage detection system shown in FIG. 1, each pair of the leakage sensors 11 is connected to an individual evaluation unit 15 through two supply cables 13 of individual length. The evaluation units 15 determine and process changes of the resistance of the leakage sensors 11. Since the evaluation unit 15 and the leakage sensor 11 may be located at a considerable distance from each other, there is the problem that resistance changes must be measured through long supply cables. Due to the intrinsic resistance of the supply cable, the maximum possible distance between the leakage sensor 11 and the evaluation unit 15 is limited. External influences on the long supply line, such as electromagnetic interference and voltage changes disturb the measuring process, which may lead to a false alarm. If such a leakage detection system is used in an explosion-prone area, the supply line must be limited in length due to the maximum admissible capacity in this area. If the supply line is too long and the capacity too high, there is a danger of capacitative charge and spark formation when the capacity is discharged. Supply lines suitable for measuring are expensive. The relatively high costs of measuring lines are often reflected in the total costs of the leakage detection system because every leakage sensor 11 and the corresponding evaluation unit 15 must be connected through an individual supply cable 13.

The high investment costs for such a leakage detection system are aggravated by the relatively high installation and service costs. A separate supply cable 13 must be laid for each leakage sensor 11. High installation costs result due to the fact that individual adjustment is required for each leakage sensor to take into account the individual length of each corresponding supply cable 13. This is not only very time-consuming but also requires well trained and cost-intensive personnel. Furthermore, costs accrue because for each false alarm, a service engineer must go to the place of the suspected leakage and check it.

There is a need for a system to combine several leakage sensors in groups with a serial data bus.

SUMMARY OF THE INVENTION

A leakage detection system is provided having a plurality of locally distributed leakage sensors and an evaluation unit connected with the sensors through a line or cable arrangement located at a distance from the leakage sensors. Each leakage sensor is connected with a local active preprocessing unit for preprocessing and digitizing the measured signal of the corresponding leakage sensor into a measuring data signal. The preprocessing unit is provided with a temperature compensation device. Each leakage sensor is connected with a local active preprocessing unit for preprocessing and digitizing a measured signal of the corresponding leakage sensor into a measuring data signal. The line arrangement is also provided with a serial bus line with branches to the individual preprocessing units for data connection with the evaluation unit. Individual address codes are assigned to the individual presupply units that are contacted through individual address codes emitted from the group comprising evaluation units and preprocessing units.

The preprocessing units may be connected with the evaluation unit through a single common bus line. The leakage sensors may further be subdivided into groups each of which is connected with the evaluation unit by means of a serial bus line shared by the same group. A monitoring unit may further be arranged subsequent to the evaluation unit to give an alarm signal when a leakage at one or more sensors is detected. Each leakage sensor may have a sensor material which has a specific electrical resistance that changes when in contact with a leaking substance such that a change in the electrical resistance is detected by the sensor and converted into a digital measuring signal by a converter.

A process for calibrating a leakage detection system is also provided.

As used herein, a line arrangement denotes the cable that is used to connect the various components of the leakage detection system.

DETAILED DESCRIPTION OF THE INVENTION

Preprocessing of sensor resistance values into digitized measuring signals at the site of each leakage sensor causes signal transmission to become more reliable than that of conventional systems over long distances. Preprocessing allows for transmission via a serial bus line along the individual leakage sensors as a replacement for the numerous individual lines or cables of the conventional leakage detection system. This saves a considerable amount of cost because fewer complex cables need be used and less cable material needs to be laid. Another substantial cost-saving factor is that fewer evaluation units are needed. A single evaluation unit suffices. This single unit communicates with the individual preprocessing units of the individual leakage sensors from one to the next in a time mode to take up their measuring signals. Furthermore, preprocessing at the site of the leakage sensor by using active components allows for temperature compensation at the site of the leakage sensor so that accurate measuring data are obtained. This prevents false alarms.

The use of a data line which is less susceptible to disturbances and the preprocessing of the measured resistance values through active components causes transmission to be effected to an evaluation station which may be several kilometers away from the leakage sensor.

The preprocessing device may be located in the same housing as the leakage sensor. This may be the housing used for the leakage sensor itself. Thus the preprocessing unit is a part of the sensor, which facilitates the installation of the leakage detection system.

Since the line arrangement which connects the evaluation unit with the individual leakage sensors no longer needs to transmit any resistance values, the line resistance of the line arrangement is not critical. Therefore it is no longer necessary to adjust each leakage sensor and each individual supply line, as is the case with the conventional leakage detection system.

Since the leakage detection system of the invention may be designed as a self-calibrating system, no specially trained personnel is required to install it. For self-calibration, the leakage detection system of the invention is initially started with the leakage sensors in a non-contaminated environment. The measured value is stored as a reference value. For subsequent leakage monitoring measurements, the actual value measured is compared with the reference value. The result of the comparison is then evaluated to detect a leakage.

Optical wave guides may also be used as a connecting line arrangement because in contrast to known leakage detection system, the line arrangement need not transmit any electrical values but only digitized data.

Figure 1:
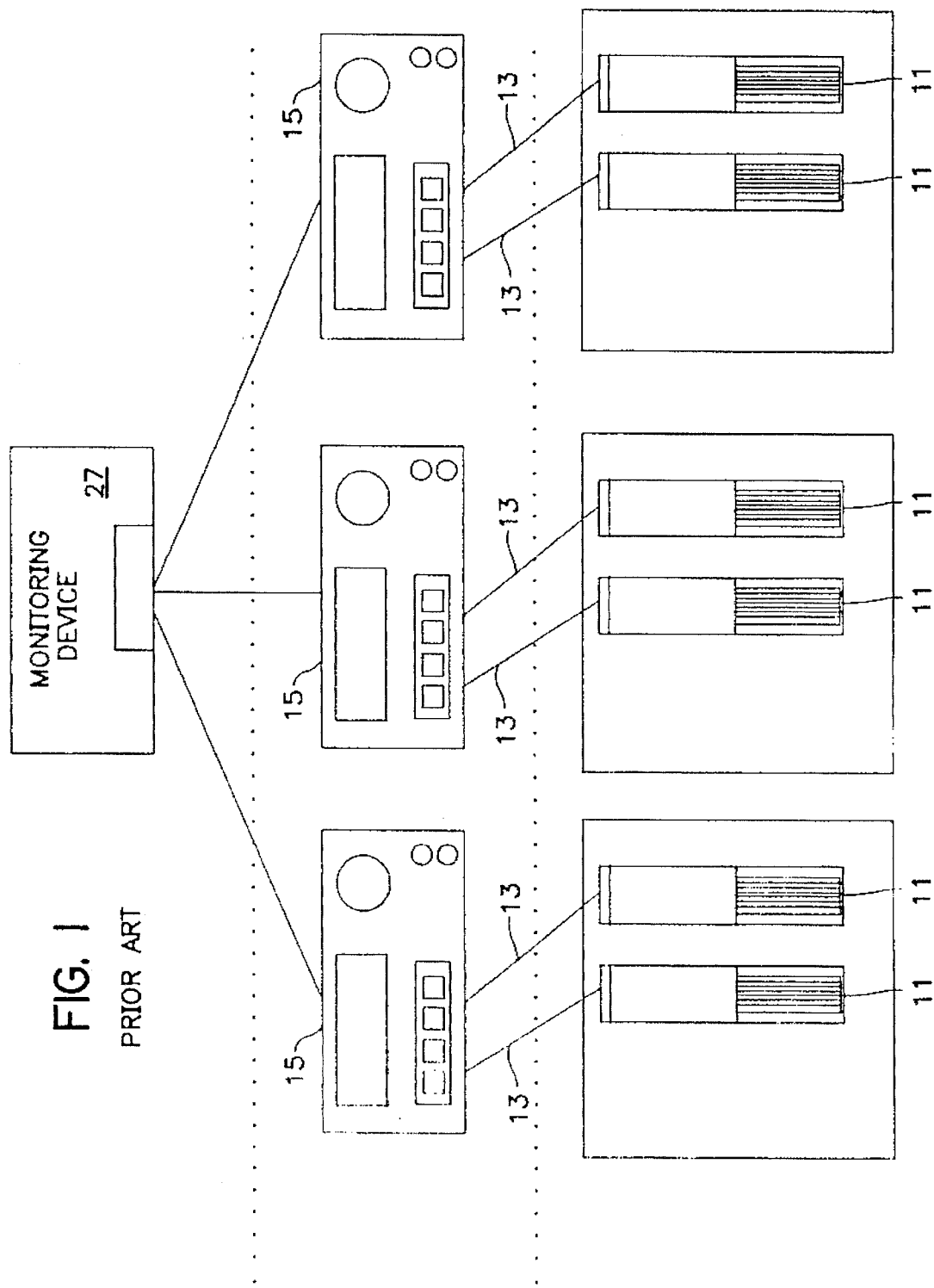
FIG. 1 is a schematic view of the presently existing leakage detection systems.
Figure 2:
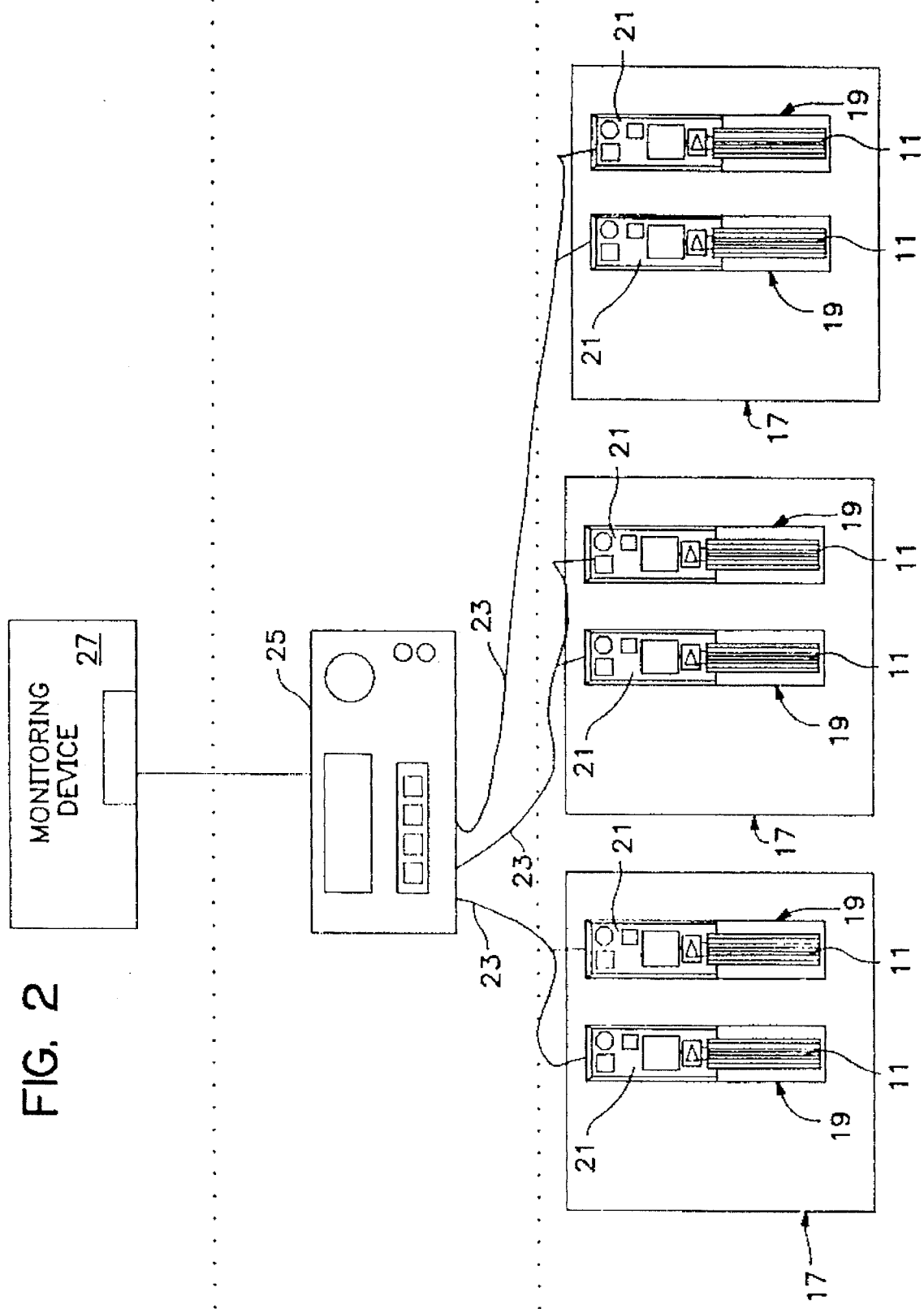
FIG. 2 is an embodiment of the leakage detection system made in accordance with the invention.

The invention is best understood by reference to the accompanying figures. FIG. 2 shows an embodiment of the invention where it is possible to combine several leakage sensors 11 in groups with one serial data bus each and to connect each group with the evaluation unit through a joint serial data bus. This division into groups is advisable if the leakage sensors of one group are located close to each other whereas other groups of leakage sensors are located far apart. This may be the case in the situation where several tanks or groups of tanks need to be monitored at a gas station or in an oil refinery which are located at a significant distance from each other. In this case it is more economical to lay a separate serial bus line to each group instead of connecting all leakage sensors of all groups with a single bus line.

If, however, all leakage sensors or all groups of leakage sensors are located close together, it is generally preferable to connect all leakage sensors with a single serial bus line.

In the embodiment shown in FIG. 2, there are three groups 17 with two integrated units 19 each consisting of a leakage sensor 11 and a preprocessing unit 21. Each group 17 is connected with a common evaluation unit 25 through a common serial bus line 23.

If a substantial number of groups 17 or integrated units 19 are distributed over a large space, it may be preferable to provide for several evaluation units 25 each of which is connected with one or more of the groups 17.

In the embodiment shown, the evaluation unit 25 is connected with a monitoring and alarm unit 27 which gives an alarm signal when a leakage is detected.

Figure 3:
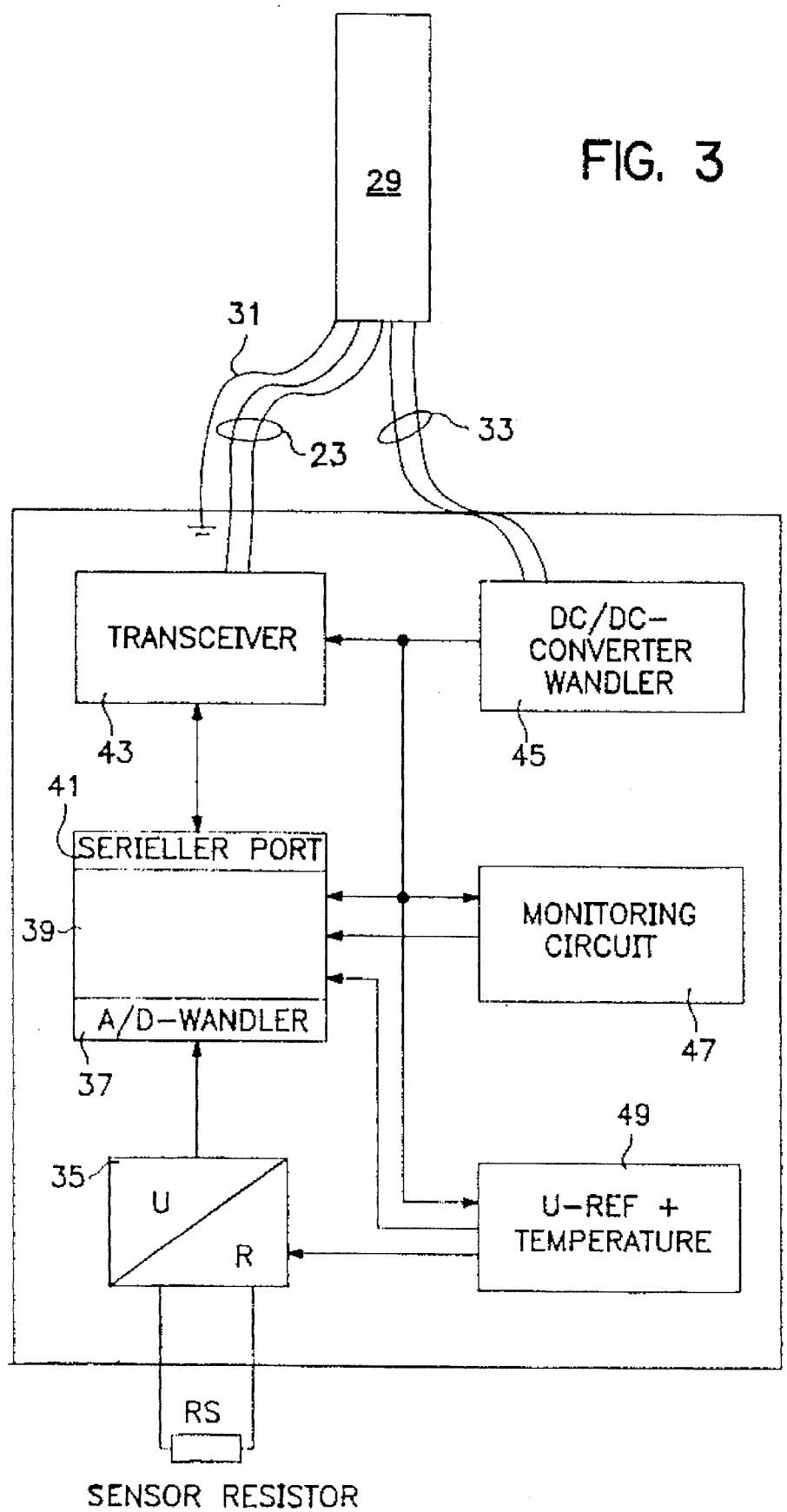
FIG. 3 is a schematic drawing of the leakage sensor with a preprocessing unit.

FIG. 3 shows a single integrated unit 19 in a block circuit diagram and a connection with a bus cable 29. The bus cable 29 contains a two-conductor serial bus line 23, a grounding line 31 and a two-conductor voltage supply line 33. The bus cable 29 is in the form of a serial cable from which stub-like branches lead to the individual integrated units 19.

In FIG. 3, the leakage sensor is shown as a sensor resistor RS which is connected with a resistor-voltage-transducer circuit 35, leading to an analog/digital converter (A/D) 37 which is part of a microcontroller (μC) 39. Through a serial port (SIO) 41, the microcontroller 39 is connected with a transmitter/receiver or transceiver 43 to which a potential separation device is assigned. The transceiver 43 itself is connected with the two conductors of a serial bus line 23.

A potential-separating dc/dc converter 45 is connected to the voltage supply line 33. It supplies the individual components of the integrated unit 19 with the required supply voltages. These components include a monitoring circuit (watchdog) which checks whether the microcontroller 39 works without faults. Furthermore, a temperature detector circuit 49 transmits an outlet signal corresponding to the actual temperature at least to the microcontroller 39. As shown in FIG. 3, the temperature detector circuit 49 also transmits a signal to the resistance/voltage converter 45.

The integrated unit 19 shown in FIG. 3 works as follows:

The leakage sensor 11 is wetted with a leaking substance, such as oil or gasoline, causing the electrical resistance RS of the leakage sensor 11 to change. The resistance converts into a voltage signal through the resistance/voltage converter 35 and into a digital measuring signal through the analog/digital converter 37. The latter signal is kept ready for retrieval in the microcontroller 39.

An individual address code is assigned to each integrated unit 19 which is connected to a common serial bus line 23. The evaluation unit 25 queries the measuring data signals of the individual units 19 in a pre-determined sequence by emitting the address codes of the individual integrated units 19 in certain time intervals via the serial bus line 23. The emitted address codes are compared to the individual address codes in the transceivers 43 or in the microcontrollers 39 of all units 19 connected to the serial bus line 23. The integrated unit 19 whose address code corresponds to the one just being emitted by the evaluation unit 25 sends its measuring data signal through the serial bus line 23 to the evaluation unit 25. Thus the individual integrated units 19 are queried in a time multiplexing mode, sometimes also with priorities predetermined for individual integrated units 19. In this way the individual integrated units 19 are queried one by one to find out whether one of their measuring values has changed.

For safety reasons, a galvanic separation is required in the area of the transceiver 43 and the dc/dc converter 45 in explosion-prone areas.

Figure 4:
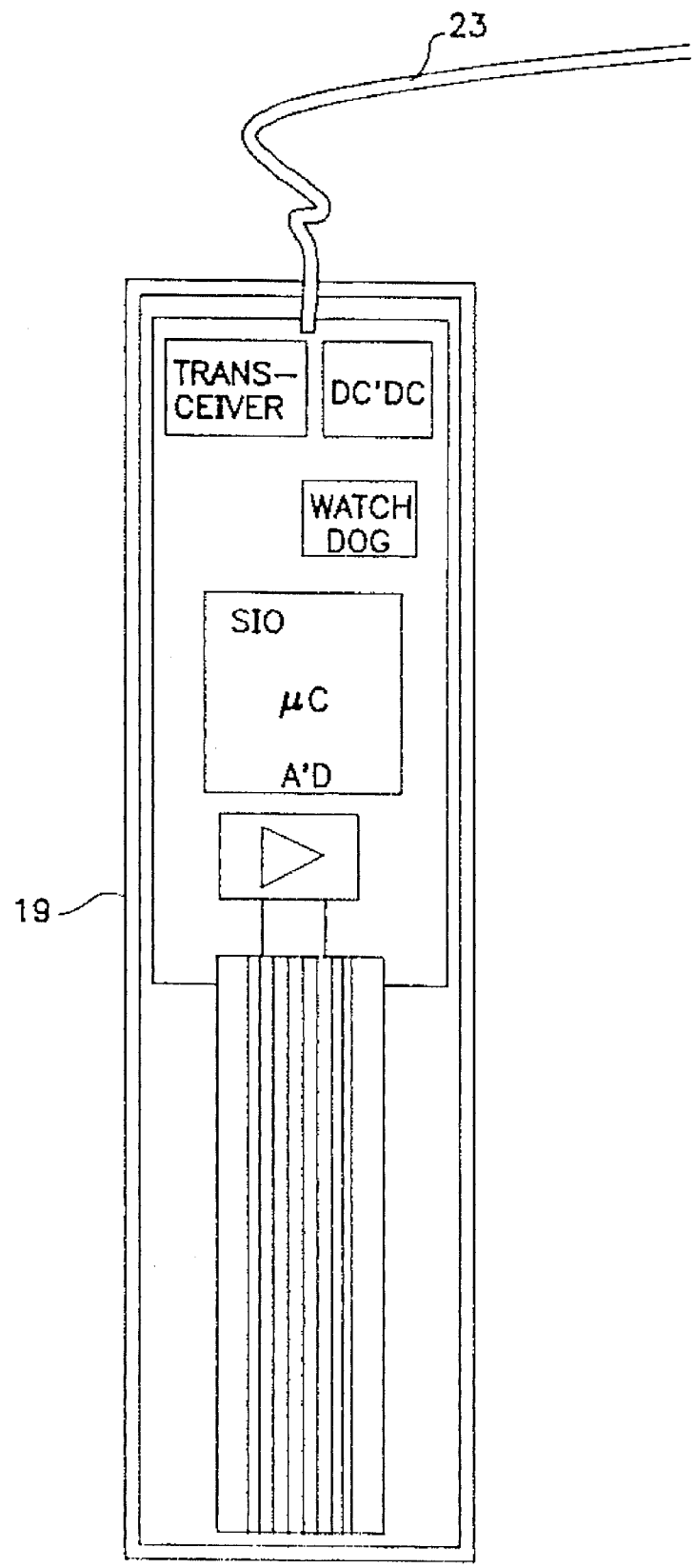
FIG. 4 is a schematic drawing with an external voltage supply.

FIG. 4 shows an embodiment of an integrated unit 19 with an external voltage supply.

Figure 5:
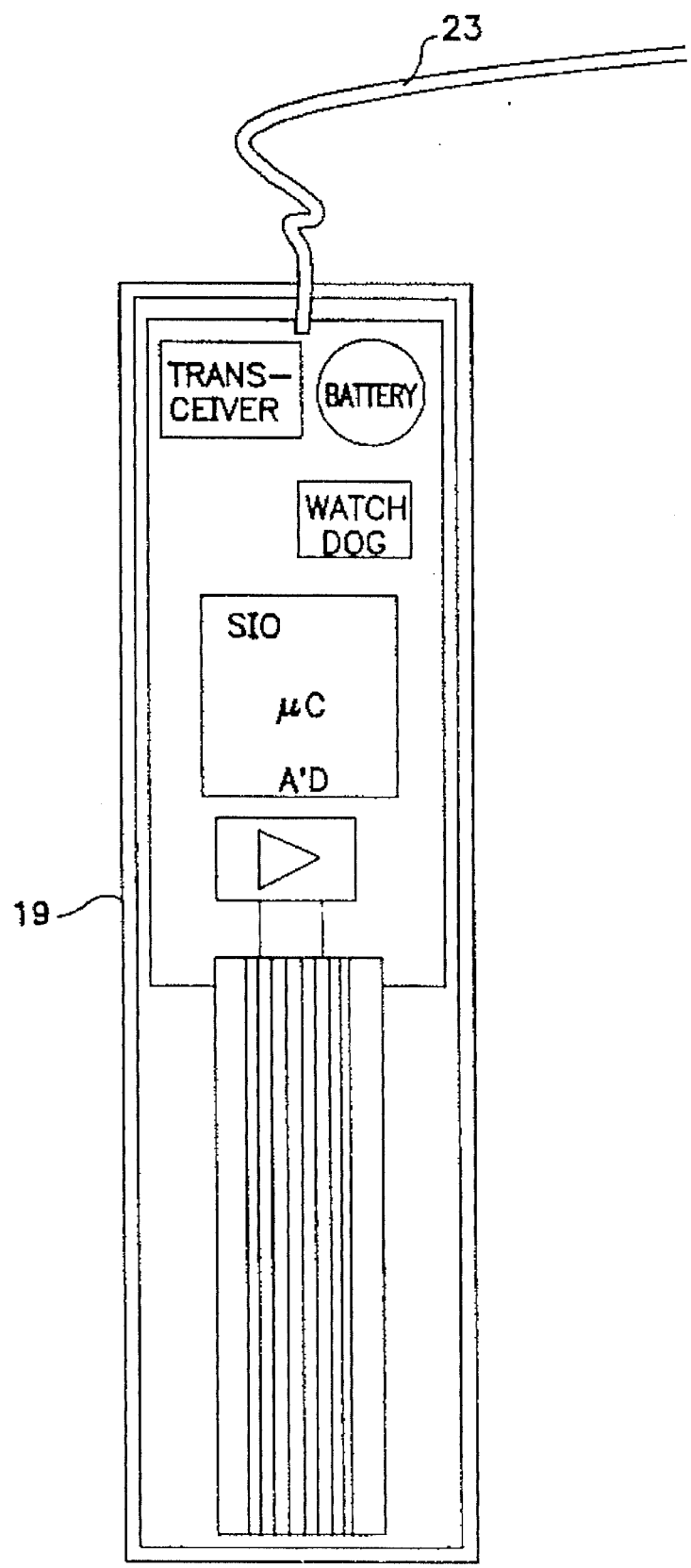
FIG. 5 is a schematic drawing with an internal voltage supply.

FIG. 5 shows an embodiment of an integrated unit 19 with an internal voltage supply in the form of a battery. In this embodiment, the cable 29 does not need any voltage supply line 33 and the dc/dc converter is rendered superfluous.

Figure 6:
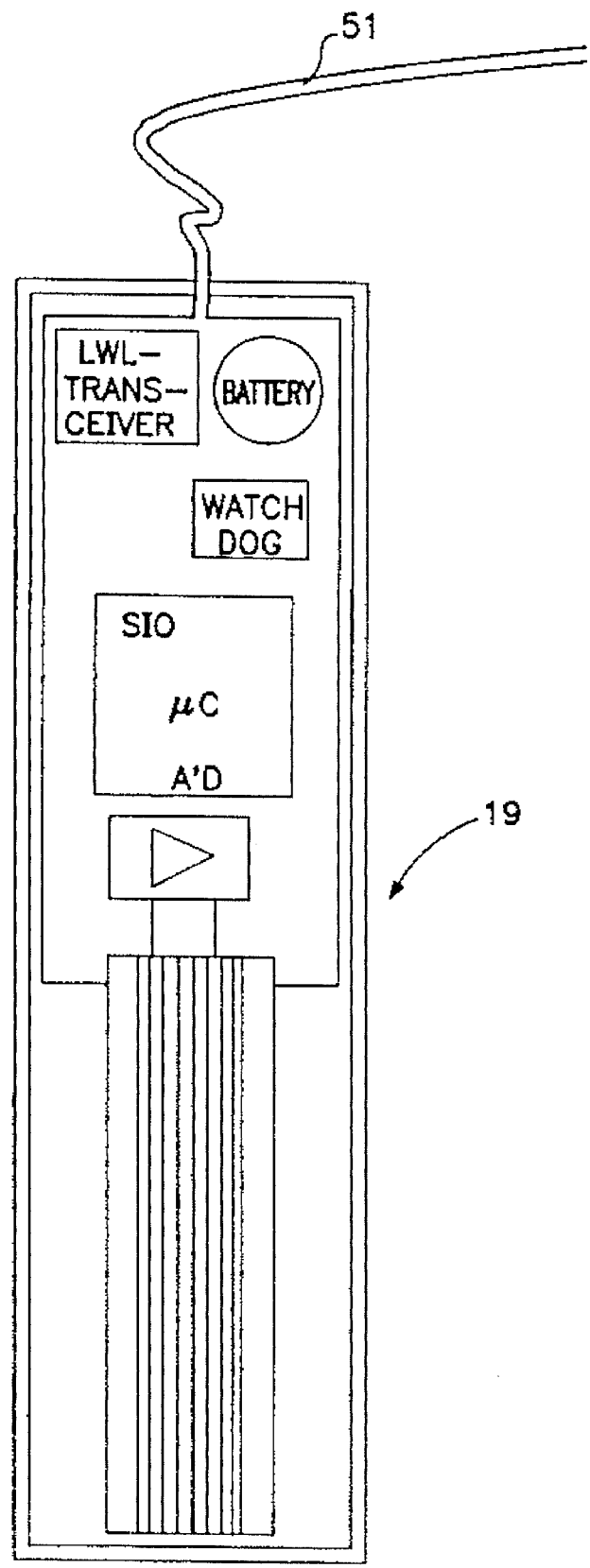
FIG. 6 is a schematic drawing with internal voltage supply and signal transmission via optical wave guides.

FIG. 6 shows an embodiment in which the transmission is effected between the integrated unit 19 and the evaluation unit 25 through an optical wave guide 51.

I claim:

1. A leakage detection system comprising:
   at least one integrated unit having an individual, predetermined address code, the at least one integrated unit comprising a resistance measuring sensor electrically connected to a preprocessing unit, the preprocessing unit being defined at least by a resistance-to-voltage converter, an analog-to-digital converter, a transceiver, and a microcontroller, wherein at the location of the sensor, the preprocessing unit converts a predetermined measured resistance into a predetermined voltage by way of the resistance-to-voltage converter, and wherein the preprocessing unit converts the predetermined voltage into a predetermined digital signal by way of the analog-to-digital converter, the digital signal being stored in a memory of the microcontroller;
   a serial data line disposed in signal communication with the at least one integrated unit; and
   at least one evaluation unit disposed in signal communication, by way of the serial data line, with the at least one integration unit, wherein the at least one evaluation unit queries the at least one integrated unit for the predetermined digital signal, by a time multiplexing mode wherein the predetermined address code is transmitted by the evaluation unit, wherein upon receiving the predetermined address code, the integrated unit transmits the predetermined digital signal to the at least one evaluation unit, by way of the serial data line, for interpretation.

2. The leakage detection system of claim 1, wherein a monitoring unit is disposed in signal communication with the evaluation unit, the monitoring unit providing an alarm signal when the evaluation unit detects a leakage at at least one leakage sensor.

3. The leakage detection system of claim 1, wherein the resistance measuring sensor and the preprocessing unit are accommodated in a common housing.

4. A leakage detection system of claim 1, wherein the serial bus line is designed as an electrical two-wire line.

5. A process for calibrating a leakage detection system, the leakage detection system comprising at least one integrated unit having an individual, predetermined address code, the at least one integrated unit comprising a resistance measuring sensor electrically connected to a processing unit, the preprocessing unit being defined at least by a resistance-to-voltage converter, an analog-to-digital converter, a transceiver, and a microcontroller, wherein at the location of the sensor, the preprocessing unit converts a predetermined measured resistance into a predetermined voltage by way of the resistance-to-voltage converter, and wherein the preprocessing unit converts the predetermined voltage into a predetermined digital signal by way of the analog-to-digital converter, the digital signal being stored in a memory of the microcontroller; a serial data line disposed in signal communication with the at least one integrated unit; and at least one evaluation unit disposed in signal communication, by way of the serial data line, with the at least one integration unit, wherein the at least one evaluation unit queries the at least one integrated unit for the predetermined digital signal, by a time multiplexing mode, wherein upon receiving the predetermined address code, the integrated unit transmits the predetermined digital signal to the at least one evaluation unit, by way of the serial data line, for interpretation, the process comprising the steps of:
   a) obtaining a predetermined digital signal for an environment not contaminated by a leakage substance;
   b) storing the predetermined digital signal as a reference value; and
   c) comparing the predetermined digital signal measured in a subsequent leakage monitoring process to the reference value.

* * * * *